United States Patent [19]

Robbins et al.

[11] 4,133,572
[45] Jan. 9, 1979

[54] UTILITY TRAILER

[76] Inventors: Sammy L. Robbins, Route 2, Box 327; Bobby D. Armour, Rte. 2, both of Natchitoches, La. 71457

[21] Appl. No.: 812,482

[22] Filed: Jul. 5, 1977

[51] Int. Cl.² .............................................. B60P 3/34
[52] U.S. Cl. ................... 296/23 R; 280/789; 296/24 R
[58] Field of Search ............... 296/23 R, 23 A, 23 H, 296/24 R; 280/106 T, 63

[56] References Cited

U.S. PATENT DOCUMENTS

| 2,733,661 | 2/1956 | Surgi | 280/63 X |
|---|---|---|---|
| 3,623,763 | 11/1971 | Boyd et al. | 296/23 R |
| 3,667,799 | 6/1972 | Shryock | 296/24 A X |
| 3,705,743 | 12/1972 | Toomey | 296/23 R |
| 3,810,487 | 5/1974 | Cable et al. | 296/24 X |
| 3,845,980 | 11/1974 | Grabast | 296/23 R |

Primary Examiner—Joseph F. Peters, Jr.
Assistant Examiner—Gene A. Church
Attorney, Agent, or Firm—John M. Harrison

[57] ABSTRACT

A utility trailer having folding and retractable sides and end panels, tool and equipment storage bins, and a power winch, and further characterized by power operated tools and equipment which may be driven by a power take-off unit on the towing vehicle or an optional auxiliary engine. In a preferred embodiment, the utility trailer is mounted on a conventional style chassis and includes a set of brackets for mounting gin poles to facilitate lifting of equipment and supplies.

12 Claims, 4 Drawing Figures

U.S. Patent
Jan. 9, 1979
4,133,572
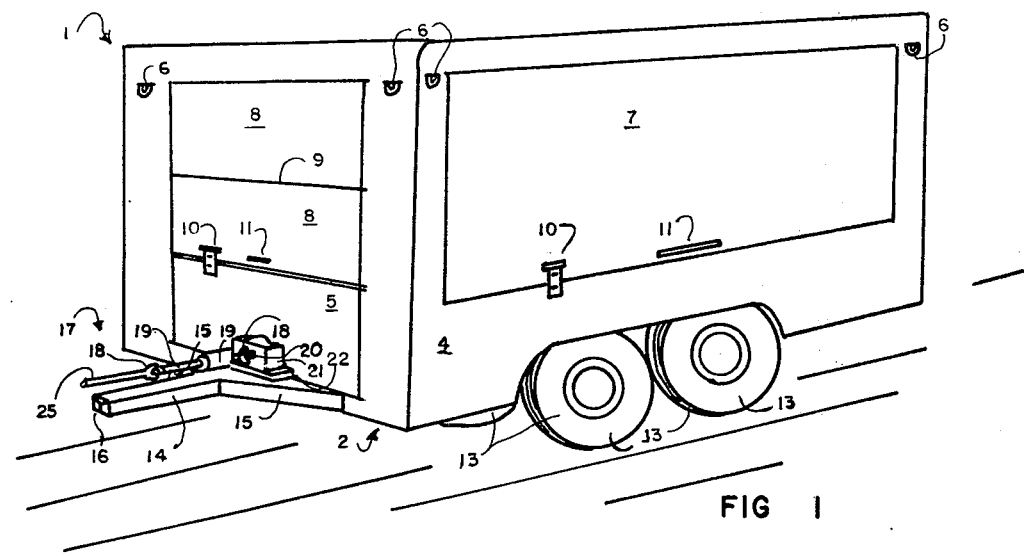
FIG 1
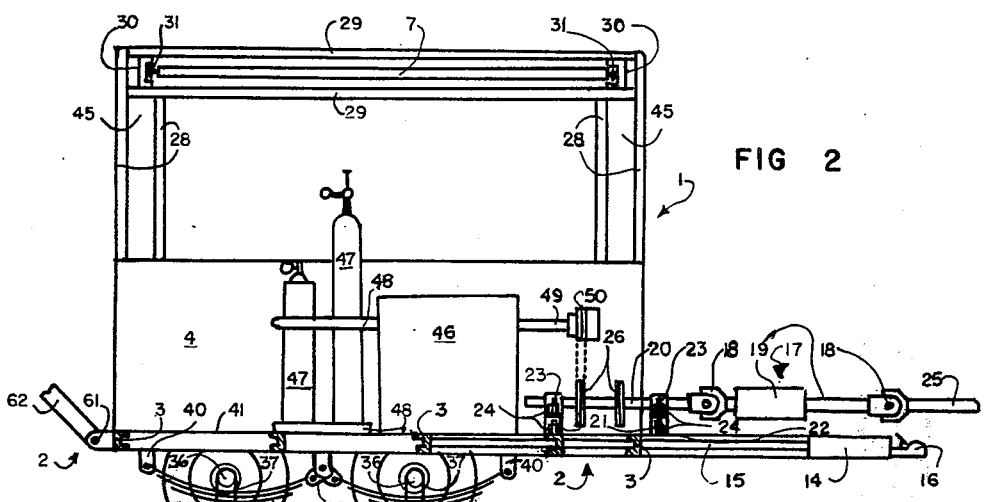
FIG 2
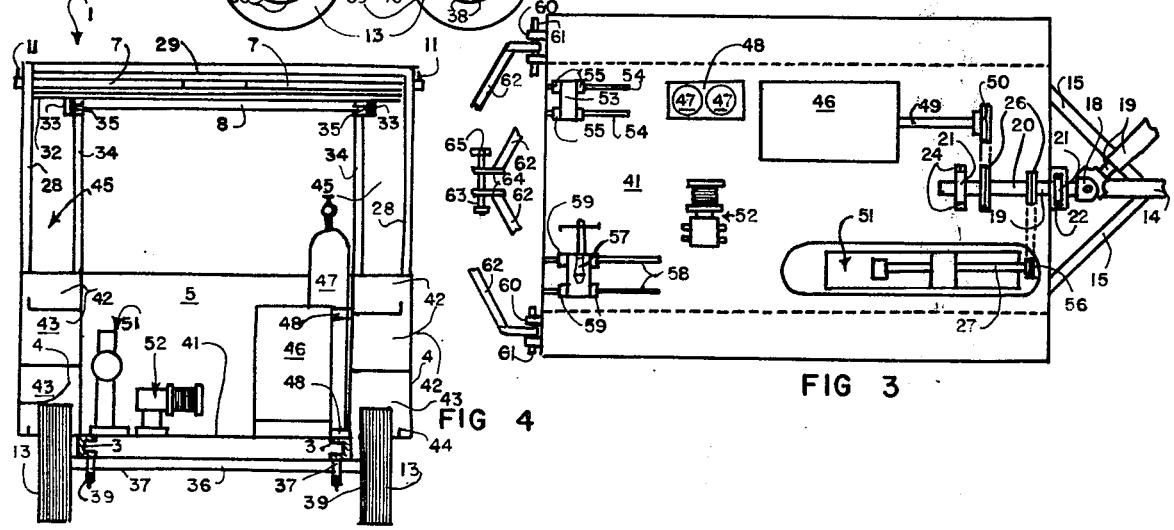
FIG 3
FIG 4

UTILITY TRAILER

BACKGROUND OF THE INVENTION

1. Field of the Invention

This invention relates to mobile utility equipment, and more particularly, to a substantially self-contained utility trailer which can be used in the field to accommodate a wide variety of maintenance and daily farm work projects. The trailer can be pulled by substantially any vehicle including trucks, tractors, automobiles and the like, and the power equipment in the trailer can be driven by an auxiliary engine or by a power take-off unit on the towing vehicle. The utility trailer is designed to provide a compact tool, equipment and parts carrier for a wide variety of projects and operations, and is capable of mobilizing both power and hand tools as well as essential equipment to perform substantially any job in the field.

2. Description of the Prior Art

Heretofore, various prior art utility trailers have been used for performing a variety of work functions, including maintenance and construction projects. Typical of such units is the mobile power unit described in U.S. Pat. No. 2,733,661 to W. F. Surgi, which discloses a mobile power unit consisting of an engine mounted on a trailer and designed to provide power for driving electric power tools, operating lights and the like. Similarly, U.S. Pat. No. 2,600,643 to W. Hagelgantz discloses a portable welder which is coupled to a towing vehicle and is operated by a power take-off unit provided in the towing vehicle, the welder itself being attached to a wheel-mounted platform for mobility. Other trailers typified by the trailer disclosed in U.S. Pat. No. 3,705,743 to Thomas J. Toomey are also known in the prior art. The Toomey combination kitchen and clothes trailer is designed to be pulled by a towing vehicle and is fitted with a hinged side panel which may be lifted and supported on a pair of rods to expose the interior of the trailer, which is designed to receive an oven, a refrigerator and various storage bins for easy access while in the field. The trailer also includes adjustable shelved compartments for the storage of food and other items, and the front and rear of the trailer are fitted with doorways which open into a hall area to provide access to a clothing storage area extending the full length of the trailer and equipped with extendable clothes racks. In like manner, U.S. Pat. No. 2,365,940 to K. W. Couse discloses a traveling workshop built in a truck, which shop includes work benches and a variety of tools and equipment of various description, including welding and related equipment. The truck is also fitted with panels which are hinged to the body and which may be lifted to provide access to the various interior areas of the workshop in a manner similar to the trailer disclosed in the Toomey patent.

One of the main problems associated with performing maintenance, construction and general job operations in rural areas, and farming operations in particular, is the difficulty of providing adequate maintenance and achieving efficient job performance at widely scattered locations in the various farming operations. Ownership of the variety of tools and equipment necessary to accomplish the various jobs does not, in the absence of ready access to such tools and equipment and a technique for providing the proper tool and/or equipment to the desired location at the proper time, insure success in the mechanical operation of a farm. For example, while the power take-off equipment provided in a modern tractor may serve to operate certain equipment such as conveyor systems, seeding equipment and grass cutting implements such as the well known "Bush Hog", there frequently exists the need to perform, for example, a welding operation for on-the-spot repair work at one location, and to operate a pump or air hammer at another point, and the like. Completing the variety of jobs to be done by using equipment which is stored in a central location such as a barn or warehouse translates into several trips to the barn or warehouse area to pick up the proper equipment, move it out into the field to the specific location where it is needed, and perform the required job. This requires a great expenditure of time and effort, and frequently means that some jobs are simply not taken care of for lack of time. The result is deterioration of equipment, high expense, and inefficient use of both manpower and equipment.

Accordingly, it is an object of this invention to provide a new and improved utility trailer which is capable of carrying all of the necessary equipment, tools, and supplies, including power tools and equipment, as well as spare parts and accessory items to effect maintenance and servicing of existing equipment, as well as performing the everyday farming operations and other operations incidental to the use of the trailer, which trailer is also capable of driving the power tools and equipment by means of a self-contained auxiliary engine or a power take-off unit on the towing vehicle.

Another object of this invention is to provide a new and improved utility trailer which is capable of carrying a wide variety of tools, parts, equipment, and supplies, including such equipment as a welder, air compressor, vise, anvil, and a winch, and other tools, which power equipment may be driven by a power take-off unit built into the towing vehicle or by an auxiliary engine carried by the trailer.

Yet another object of the invention is to provide a new and improved utility trailer which can be towed by a suitable vehicle such as a tractor or a truck, and which is fitted with removable or folding and retractable side, front, and rear panels to expose the interior of the trailer for easy access to the tools, equipment and/or parts.

A still further object of the invention is to provide a new and improved utility trailer which may be easily towed to and from remote job locations in the field, and which is fitted with power equipment, including power tools and a power winch, and which may also contain spare parts and a vise, an anvil, gin pole brackets and gin poles in cooperation with the winch for lifting operations.

Yet another object of the invention is to provide a utility trailer which is capable of being coupled to and towed by a vehicle such as a tractor or a truck, and which is fitted with a power take-off drive means for driving equipment located in the trailer such as a welding rig, an air compressor, and other power equipment including a power winch, which trailer further includes hand tools, spare parts, and a pair of removable gin poles for use in cooperation with the power winch to lift equipment in the field.

Another object of the invention is to provide a new and improved utility trailer which is capable of being removably hitched to a towing vehicle and which is compatible with a power take-off unit and/or an auxiliary engine carried by the trailer for driving power tools and equipment located in the trailer, which trailer is also fitted with side panels and end panels which can be opened and recessed into racks built into the top of the trailer or opened and propped in an essentially horizontal position to provide shade and to permit access to the equipment, tools, parts and/or supplies located in the interior of the trailer.

SUMMARY OF THE INVENTION

These and other embodiments of the invention are provided in a utility trailer which is capable of being towed by a vehicle such as a tractor or truck, and which includes power tools and equipment such as a welding apparatus, an air compressor, air hammers and winches and the like, which are capable of being driven by a power take-off unit on the towing vehicle or an auxiliary engine carried by the trailer. The trailer is further characterized by convenient, retractable side, front and rear panels which are capable of being opened and braced in an essentially horizontal position to provide shade, or in the alternative, recessed and stored in racks fitted in the top of the trailer. The trailer is also fitted with storage bins for storing small hand tools and power tools and equipment, as well as such items as extension cords, welding leads, air hoses and spare parts. The trailer can also be provided with other accessory equipment such as a power winch and gin poles for lifting operations, and an anvil, a vise, and the like, all or each of which may be removably mounted to the floor of the trailer, or, in a preferred embodiment, slidably mounted on rods to permit repositioning, as desired, in order to accommodate work stock of varying dimensions.

BRIEF DESCRIPTION OF THE DRAWINGS

The invention will be better understood in view of the following description presented with reference to the accompanying drawing wherein:

FIG. 1 of the drawing is a perspective view of the utility trailer of this invention;

FIG. 2 is a right side sectional view of the utility trailer illustrated in FIG. 1;

FIG. 3 is a top sectional view of the utility trailer illustrated in FIG. 1; and FIG. 4 is a front sectional view of the utility trailer illustrated in FIG. 1 of the drawing.

DESCRIPTION OF THE PREFERRED EMBODIMENTS

Referring now to FIGS. 1, 2 and 4 of the drawing, the utility trailer of this invention is generally illustrated by reference numeral 1, and is shown with chassis 2, formed by channels 3, more particularly illustrated in FIGS. 2 and 4 of the drawing. Side panels 4 and end panels 5 are permanently attached to chassis 2 in conventional manner, and tie-down brackets 6 are formed in recesses provided in side panels 4 and end panels 5, as illustrated. Movable side panels 7 and movable end panels 8 are adapted to be opened away from side panels 4 and end panels 5, respectively, by disengaging hasp 10 and grasping handle 11, and may be either supported horizontally or retracted into racks built into the top of utility trailer 1 as hereinafter described. The front panel of movable end panels 8 is preferably built in two sections joined by a hinge 9 in order to facilitate a partial opening of the panel, for reasons hereinafter set forth.

Referring now to FIGS. 1-3 of the drawing, utility trailer 1 is provided with at least two, and preferably four wheels 13, depending upon design, load and weight requirements, and is fitted with a tongue 14 and braces 15, with hitch 16 provided on the end of tongue 14 for attachment to a towing vehicle (not illustrated). In a preferred embodiment, the trailer is also provided with a power take-off drive, generally illustrated by reference numeral 17, which includes a pair of universal joints 18, which connect an extensible shaft 19 to a pulley shaft 20 and a drive shaft 25, respectively, the latter of which communicates with the power take-off unit of the towing vehicle. It will be appreciated by those skilled in the art that in an alternative embodiment of the invention an auxiliary engine can be provided on tongue 14 and braces 15, or inside utility trailer 1, as desired, in lieu of, or in addition to the power take-off drive 17. Piller block bearings 21 serve to facilitate a smooth rotation of pulley shaft 20 responsive to the rotation of the vehicle power take-off unit, and are mounted on tongue 14 by means of piller block bearing plates 22, mounting bolts 23, and mounting nuts 24. Pulleys 26, carried by pulley shaft 20, may vary in diameter according to need, and are preferably keyed or fastened by means of set screws to pulley shaft 20 in adjustable fashion to permit belt cooperation with welding drive shaft pulley 50 and air compressor pulley 56, carried by welding drive shaft 49 and air compressor pulley shaft 27, respectively.

Referring now particularly to FIGS. 2 and 4 of the drawing, utility trailer 1 is fitted with upper frame members 28 and top frame members 29 which serve to shape the top of the trailer and to facilitate and opening, retracting and recessing of movable side panels 7 and movable end panels 8, respectively, according to a preferred embodiment of the invention. Movable side panel brackets 30 are mounted between the parallel mounted top frame members 29 at either end thereof, and are adapted to receive movable side panel rollers 31, which are rotatably attached to each end of movable side panels 7 in order to facilitate retraction of movable side panels 7 between top frame members 29 when movable side panels 7 are lifted from the configuration illustrated in FIG. 1 upwardly, and slidably retracted and recessed as illustrated in FIG. 2. Referring now to FIG. 4 of the drawing, movable end panel bracket mount 32 is provided in spaced relationship from and essentially parallel to top frame members 29 in order to provide space for retraction and recession of movable end panels 8 in the same manner as movable side panels 7. Movable end panel brackets 33 are attached to movable end panel bracket mount 32 and to movable end panel bracket braces 34, the latter of which are positioned in essentially vertical relationship to stabilize movable end panel brackets 33, as illustrated. Movable end panel rollers 35 are rotatably positioned on the ends of movable end panels 8, and engage movable end panel brackets 33, as illustrated. By this mechanical arrangement, both movable side panels 7 and movable end panels 8, or any of them, can be lifted from the positions illustrated in FIG. 1 and slidably retracted and recessed in a position essentially parallel to the top of utility trailer 1 as illustrated in FIGS. 2 and 4 of the drawing, in order to conveniently provide access to the interior of utility trailer 1 and to remove movable side panels 7 and movable end panels 8 from the area of work. In the alternative, it will be appreciated by those skilled in the art that both movable side panels 7 and movable end panels 8 or any of them, can be lifted and stabilized in an essentially horizontal, non-retracted position by means of poles or braces in any convenient manner to provide shade for the worker as the tools, supplies, equipment and/or parts are used and/or removed from the trailer in performing the necessary work. It will be appreciated by reference to FIG. 1 that the top segments of side panels 4 and end panels 5 serve to prevent movable side panel rollers 31 and movable end panel rollers 35 from exiting movable side panel brackets 30 and movable end panel brackets 33, respectively, when movable side panels 7 and movable end panels 8 are in closed configuration, as illustrated.

Referring again to FIGS. 2, 3 and 4 of the drawing, wheels 13 of utility trailer 1 are mounted in conventional fashion on axles 36, which are in turn securely fashioned to the chassis 2 of utility trailer 1 by means of axle mount brackets 37 and axle mount bracket bolts 38, in cooperation with springs 39. Similarly, spring mounts 40 serve to securely position the ends of springs 39 to chassis 2 in conventional manner, and a floor 41 is provided in utility trailer 1, upon which to mount and stabilize various tools and equipment such as the welder 46, welding bottles 47, an air compressor 51, a winch 52, an anvil 53, and a vise 57. Utility trailer 1 is also fitted with storage bins 42, particularly illustrated in FIG. 4 of the drawing, and wheel wells 43 are provided with a wheel well rib 44 for storing gin poles 62 when the latter are removed from gin pole brackets 60 and stored between wheel well rib 44 and side panels 4 inside wheel wells 43 and the storage bins 42 adjacent and longitudinally aligned with wheel wells 43.

As heretofore described, and referring again to FIG. 3 of the drawing, typical equipment which may be mounted on floor 41 of utility trailer 1 is a welder 46, including welding bottles 47, the latter of which are secured in place by welding bottle supports 48. Welding drive shaft 49 of welder 46 carries welding drive shaft pulley 50, as heretofore noted, for belt or chain engagement with one of drive pulleys 26, secured to pulley shaft 20, to facilitate operation of welder 46. Air compressor 51 is mounted in like manner to floor 41, preferably adjacent welder 46 in order to position it in belt or chain drive relationship with another of drive pulleys 26, while a winch 52 is positioned near the center of floor 41, as illustrated in FIG. 3 of the drawing. An anvil 53 is also preferably slidably mounted on anvil support rods 54 by means of anvil collars 55 to permit adjustment of anvil 53 on anvil support rods 54 in order to accommodate work stock of various size and shapes. Similarly, vise 57 is preferably spaced from anvil 53 in the rear of utility trailer 1 and may likewise be mounted on vise support rods 58 and vise collars 59 to permit sliding adjustment thereof. As also heretofore noted, utility trailer 1 is fitted with gin pole brackets 60 positioned on the rear of chassis 2 and adapted to removably receive gin poles 62 by means of gin pole bracket pins 61. When assembled on gin pole bracket 60, gin poles 62 can be provided with a pulley which is typically positioned between gin pole plates 64 by means of gin pole pin 63 and gin pole pin bolt 65 to facilitate lifting of heavy equipment and/or parts.

It will be appreciated by those skilled in the art that the utility trailer of this invention is designed to be entirely self-contained for the jobs to be accomplished, and to provide the means for repairing and/or servicing virtually any equipment desired in the field, and in farming activities and operations in particular. However, it will be appreciated that the utility trailer can be used in various construction and maintenance operations such as oil field activities and the like by simply providing the appropriate parts, tools and equipment for the trailer according to the specific job needs. While the utility trailer is designed to be operated by a power take-off unit provided on the towing vehicle, as heretofore described, it can likewise be driven by an engine located on or in the trailer itself, as well as by such a power take-off unit. The utility trailer is designed to carry substantially all electric, air operated and hand tools necessary to accomplish a variety of general jobs and maintenance operations, including generator powered portable lights, hand tools, air operated or power operated tools such as air hammers and winches, and nail and staple guns, power supply equipment such as an air compressor and welding equipment, a power winch, a vise, an anvil, and the like. Referring again to the drawing, storage bins 42 and top storage areas 45 are designed to accommodate substantially any small tool as well as various accessory equipment such as extension cords, welding leads, and air hoses, as well as parts and supplies necessary for repair and servicing in the field. Generally speaking, the lower storage bins 42 are preferably adapted for the storage of tools and equipment, while the upper storage bins 42 are designed to carry bolts, nuts and similar parts and supplies. It will be further appreciated as illustrated in FIGS. 2 and 4 of the drawing, that top storage areas 45 are particularly well suited for storing such items as extension cords, welding leads and air hoses for welder 46 and air compressor 51, respectively. In a preferred embodiment of the invention, one of top storage areas 45 is fitted with bins and compartments for storage of nuts, bolts, and the like, as well as small replacement parts, such as gaskets, bearings, and the like, and small items of equipment including funnels and similar items.

It will be further appreciated by those skilled in the art that while winch 52 may be located in substantially any position on floor 41 of utility trailer 1, it is preferred to mount winch 52 in a central location between the side panels 4 of utility trailer 1 as illustrated in FIG. 3 of the drawing, in order to align it with gin poles 62 to facilitate lifting of heavy equipment, as necessary. Furthermore, a single belt, or several belts may be used to drive both air compressor 51 and welder 46, depending upon the particular type of welding apparatus and air compressor utilized, the pair of drive pulleys 26, the welding drive shaft pulley 50, and the air compressor pulley 56 being provided in the drawing as illustrative of only a single embodiment of applicant's invention. Sprockets and chains or gear box systems can also be substituted for the pulleys and belts in the welding and air compressor drive system, as desired, according to the knowledge of those skilled in the art. It will also be appreciated that while movable end panels 8 may be provided in single panel units in the manner of movable side panels 7, as illustrated in FIG. 1 of the drawing, it is preferred to provide movable end panels 8 in two pieces joined by hinge 9 as illustrated, and as heretofore described, in order to permit a partial retraction of movable end panels 8 in the manner described above to permit quick access to welder 46, air compressor 51 and related equipment from the front of utility trailer 1.

As heretofore described, in a preferred embodiment of the invention the utility trailer 1 is fitted with four wheels for stability; however, it will be recognized that two wheel trailers may be utilized as desired depending upon weight and equipment load requirements. Furthermore, a spare tire (not illustrated) may be located in any convenient fashion in or on utility trailer 1, but is preferably slung under the trailer for convenient storage and access, and the trailer may be provided with suitable lighting and license plates to permit towing on the roads and highways.

In yet another embodiment of the invention the utility trailer, less wheels and chassis, can be mounted on the bed of a truck and operated either by a power take-off system in the truck or by an auxiliary engine, as described above. Furthermore, referring again to FIG. 3 of the drawing, floor 41 can be designed to bolt or clamp onto chassis 2 in order to permit relocation of the entire top portion of utility trailer 1, less chassis 2 and wheels 13, on a truck bed, and then back on chassis 2, as desired, depending upon the need. In this manner, all tools, equipment and parts are available by trailering or by transportation by truck to any desired location for a specific job. Suitable clamps for securing the top portion of utility trailer 1 to the chassis can be used according to the knowledge of those skilled in the art or, in the alternative, bolts can be used, as desired. In this convertible embodiment, it will be recognized that pillar block bearings 21 must be unbolted from channels 3 and tongue 14 in order to permit the upper portion of the trailer to be removed from chassis 2 and reinstalled on the truck bed.

Accordingly, having described my invention with the particularities set forth above, what is claimed is:

1. A utility trailer comprising:
   (a) a chassis;
   (b) a floor fastened to said chassis;
   (c) oppositely disposed storage bins positioned on said floor and extending upwardly in stacked relationship with a bottom inside portion open to the inside, and a coextensive bottom outside portion closed and forming side panels of said trailer, and a top outside portion open to the outside above said side panels;
   (d) a pair of longitudinal frame members spanning the length of and carried by each of said storage bins in vertical, spaced relationship, respectively; a pair of bracket mounts spanning the width of said trailer and carried by the bottom ones of said longitudinal frame members at each end of said bracket mounts and an end panel bracket fitted to each end of said bracket mounts beneath and in essentially parallel relationship to said longitudinal frame members;
   (e) movable side panels normally closing over said top outside portion of said storage bins in closed configuration, and capable of opening and slidably retracting between said longitudinal frame members to expose said top outside portion of said storage bins; and
   (f) movable end panels normally closing over at least a portion of the front and rear of said trailer, respectively, in closed configuration, and capable of opening and slidably retracting on said end panel bracket to provide access to the interior of said trailer.

2. The utility trailer of claim 1 further comprising power take-off linking means in said utility trailer which is compatible with a power take-off system on a vehicle, and selected power equipment included in said utility trailer cooperating with said power take-off linking means.

3. The utility trailer of claim 1 further including a welding machine fastened to said floor; an air compressor fastened to said floor in spaced relationship to said welding machine; a power winch fastened to said floor at a point essentially equidistant from each side of said trailer; a vise frame fastened to said floor; a vise slidably attached to said vise frame; an anvil frame fastened to said floor; an anvil slidably attached to said anvil frame; and power take-off linking means compatible with a power take-off system on a vehicle and cooperating with said welding machine, said air compressor and said winch for driving said welding machine, said air compressor and said winch.

4. The utility trailer of claim 1 wherein said chassis further comprises an axle and at least one set of wheels mounted on said axle.

5. The utility trailer of claim 1 further comprising power take-off linking means in said utility trailer which is compatible with a power take-off system on a vehicle, and selected power equipment included in said utility trailer cooperating with said power take-off linking means and wherein said chassis further comprises an axle and at least one set of wheels mounted on said axle.

6. The utility trailer of claim 1 wherein said chassis further comprises an axle and at least one set of wheels mounted on said axle, and further including a welding machine fastened to said floor; an air compressor fastened to said floor in spaced relationship to said welding machine; a power winch fastened to said floor at a point essentially equidistant from each side of said trailer; a vise frame fastened to said floor; a vise slidably attached to said vise frame; an anvil frame fastened to said floor; an anvil slidably attached to said anvil frame; and power take-off linking means compatible with a power take-off system on a vehicle and cooperating with said welding machine, said air compressor and said winch for driving said welding machine, said air compressor and said winch.

7. The utility trailer of claim 1 wherein said chassis is mounted on a truck.

8. The utility trailer of claim 1 further comprising power take-off linking means in said utility trailer which is compatible with a power take-off system on a vehicle, and selected power equipment included in said utility trailer cooperating with said power take-off linking means and wherein said chassis is mounted on a truck.

9. The utility trailer of claim 1 wherein said chassis is mounted on a truck and further including a welding machine fastened to said floor; an air compressor fastened to said floor in spaced relationship to said welding machine; a power winch fastened to said floor at a point essentially equidistant from each side of said trailer; a vise frame fastened to said floor; a vise slidably attached to said vise frame; an anvil frame fastened to said floor; an anvil slidably attached to said anvil frame; and power take-off linking means compatible with a power take-off system on a vehicle and cooperating with said welding machine, said air compressor and said winch for driving said welding machine, said air compressor and said winch.

10. The utility trailer of claim 1 further including a welding machine carrying a welding machine pulley fastened to said floor; an air compressor carrying an air compressor pulley fastened to said floor in spaced relationship from said welding machine; a power winch fastened to said floor at a point essentially equidistant from the sides of said trailer; a vise frame fastened to said floor; a vise slidably carried by said vise frame; an anvil frame fastened to said floor; an anvil slidably carried by said anvil frame; a pair of gin poles for mounting on said trailer in cooperation with said power winch; and a pulley shaft and pulley rotatably mounted on said floor of said trailer and cooperating with said welding machine pulley and said air compressor pulley and a power take-off system in a vehicle for driving said welding machine, said air compressor and said winch.

11. The utility trailer of claim 10 wherein at least one of said pair of movable end panels is horizontally hinged in the approximate center thereof.

12. A utility trailer comprising;
  (a) a chassis;
  (b) a floor fastened to said chassis;
  (c) opposite disposed storage bins fastened longitudinally along the sides of said floor and extending upwardly in stacked relationship, each with a bottom inside portion open in facing relationship and a co-extensive bottom outside portion closed and forming side panels of said trailer, and a top outside portion open to the outside above said side panels;
  (d) a pair of longitudinal frame members spanning the length of said trailer on each side thereof, in vertical, spaced relationship, and disposed in essentially parallel, horizontal, relationship to each other and carried by said storage bins, respectively, and a first set of brackets disposed between said frame members and spanning the width of said trailer at the front and rear thereof;
  (e) a pair of movable side panels and a first pair of rollers rotatably mounted on both ends of said side panels, said side panels normally closing said top outside portion of said storage bins when positioned in essentially vertical relationship in closed configuration, and capable of sliding and retracting between each pair of said longitudinal frame members in open configuration as said first pair of rollers are caused to engage said first set of brackets;
  (f) a pair of bracket mounts spanning the width of said trailer at the front and rear thereof and carried by said longitudinal frame members at each end of said bracket mounts, and a second set of brackets fitted to the ends of said bracket mounts beneath and in essentially parallel relationship to said longitudinal frame members; and
  (g) a pair of movable end panels and a second pair of rollers rotatably mounted on both ends of said end panels, said end panels normally closing to form a portion of the front and rear of said trailer in closed configuration, and capable of sliding and retracting below said bracket mounts and beneath and parallel to said movable side panels when said movable end panels and said movable side panels are positioned in open configuration as said second pair of rollers are caused to engage said second set of brackets.

* * * * *